US010205677B2

(12) United States Patent
Udupi et al.

(10) Patent No.: US 10,205,677 B2
(45) Date of Patent: Feb. 12, 2019

(54) CLOUD RESOURCE PLACEMENT OPTIMIZATION AND MIGRATION EXECUTION IN FEDERATED CLOUDS

(71) Applicant: CISCO TECHNOLOGY, INC., San Jose, CA (US)

(72) Inventors: Yathiraj B. Udupi, San Jose, CA (US); Xinyuan Huang, Shanghai (CN); Aparupa Das Gupta, San Jose, CA (US); Marc Solanas Tarre, San Jose, CA (US); Rishabh Jain, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 517 days.

(21) Appl. No.: 14/951,110

(22) Filed: Nov. 24, 2015

(65) Prior Publication Data

US 2017/0149687 A1    May 25, 2017

(51) Int. Cl.
*H04L 29/08* (2006.01)
*H04L 12/911* (2013.01)

(52) U.S. Cl.
CPC .......... *H04L 47/78* (2013.01); *H04L 67/1002* (2013.01)

(58) Field of Classification Search
USPC .......................................... 709/226
See application file for complete search history.

(56) References Cited

U.S. PATENT DOCUMENTS 5,812,773 A    9/1998 Norin
5,889,896 A    3/1999 Meshinsky et al.
(Continued)

FOREIGN PATENT DOCUMENTS

| CN | 101719930 | 6/2010 |
|---|---|---|
| CN | 101394360 | 7/2011 |
| CN | 102164091 | 8/2011 |
| CN | 104320342 | 1/2015 |
| CN | 105740084 | 7/2016 |
| EP | 2228719 | 9/2010 |

(Continued)

OTHER PUBLICATIONS

"OpenStack Cloud Administrator Guide," Cloud Administrator Guide, Jul. 20, 2015, 333 pages.

(Continued)

*Primary Examiner* — Normin Abedin
*Assistant Examiner* — Hermon Asres
(74) *Attorney, Agent, or Firm* — Polsinelli PC

(57) ABSTRACT

The present disclosure describes a method for cloud resource placement optimization. A resources monitor monitors state information associated with cloud resources and physical hosts in the federated cloud having a plurality of clouds managed by a plurality of cloud providers. A rebalance trigger triggers a rebalancing request to initiate cloud resource placement optimization based on one or more conditions. A cloud resource placement optimizer determines an optimized placement of cloud resources on physical hosts across the plurality of clouds in the federated cloud based on (1) costs including migration costs, (2) the state information, and (3) constraints, wherein each physical host is identified in the constraints-driven optimization solver by an identifier of a respective cloud provider and an identifier of the physical host. A migrations enforcer determines an ordered migration plan and transmits requests to place or migrate cloud resources according to the ordered migration plan.

20 Claims, 7 Drawing Sheets

(56) References Cited

U.S. PATENT DOCUMENTS

| | | | |
|---|---|---|---|
| 6,108,782 A | 8/2000 | Fletcher et al. |
| 6,178,453 B1 | 1/2001 | Mattaway et al. |
| 6,298,153 B1 | 10/2001 | Oishi |
| 6,343,290 B1 | 1/2002 | Cossins et al. |
| 6,643,260 B1 | 11/2003 | Kloth et al. |
| 6,683,873 B1 | 1/2004 | Kwok et al. |
| 6,721,804 B1 | 4/2004 | Rubin et al. |
| 6,733,449 B1 | 5/2004 | Krishnamurthy et al. |
| 6,735,631 B1 | 5/2004 | Oehrke et al. |
| 6,996,615 B1 | 2/2006 | McGuire |
| 7,054,930 B1 | 5/2006 | Cheriton |
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,583,665 B1 | 9/2009 | Duncan et al. |
| 7,606,147 B2 | 10/2009 | Luft et al. |
| 7,644,437 B2 | 1/2010 | Volpano |
| 7,647,594 B2 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B2 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,495,725 B2 | 7/2013 | Ahn |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andries et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1 | 9/2014 | Dickinson et al. |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1 | 9/2015 | Szabo et al. |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1 | 3/2016 | Dickinson et al. |
| 9,313,048 B2 | 4/2016 | Chang et al. |
| 9,361,192 B2 | 6/2016 | Smith et al. |
| 9,379,982 B1 | 6/2016 | Krishna et al. |
| 9,380,075 B2 | 6/2016 | He et al. |
| 9,432,245 B1 | 8/2016 | Sorenson, III et al. |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1 | 2/2017 | Mutnuru |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2001/0055303 A1 | 12/2001 | Horton et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0212598 A1* | 11/2003 | Raman ............... G06Q 30/02 705/14.58 |
| 2003/0228585 A1 | 12/2003 | Inoko et al. |
| 2004/0004941 A1 | 1/2004 | Malan et al. |
| 2004/0034702 A1 | 2/2004 | He |
| 2004/0088542 A1 | 5/2004 | Daude et al. |
| 2004/0095237 A1 | 5/2004 | Chen et al. |
| 2004/0131059 A1 | 7/2004 | Ayyakad et al. |
| 2004/0197079 A1 | 10/2004 | Latvala et al. |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0062187 A1 | 3/2006 | Rune |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1 | 10/2006 | Achlioptas et al. |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0080524 A1 | 4/2008 | Tsushima et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0198858 A1 | 8/2008 | Townsley et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |

(56) References Cited

U.S. PATENT DOCUMENTS

| | | |
|---|---|---|
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1 | 2/2010 | Ahmad et al. |
| 2010/0042720 A1 | 2/2010 | Stienhans et al. |
| 2010/0050172 A1* | 2/2010 | Ferris ............... G06F 9/4856 718/1 |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1 | 6/2010 | Achlioptas et al. |
| 2010/0191783 A1 | 7/2010 | Mason et al. |
| 2010/0192157 A1 | 7/2010 | Jackson et al. |
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1 | 7/2011 | Stanisic et al. |
| 2011/0206052 A1 | 8/2011 | Tan et al. |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1 | 11/2011 | Grosser et al. |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0036234 A1 | 2/2012 | Staats et al. |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0089726 A1* | 4/2012 | Doddavula ........... G06F 9/5072 709/224 |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290348 A1* | 11/2012 | Hackett ............... G06Q 10/06 705/7.13 |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1 | 8/2013 | Hu et al. |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1 | 2/2014 | Hu et al. |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |

(56) References Cited

U.S. PATENT DOCUMENTS

| | | |
|---|---|---|
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0281173 A1 | 9/2014 | Im et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |
| 2014/0295831 A1 | 10/2014 | Karra et al. |
| 2014/0297569 A1 | 10/2014 | Clark et al. |
| 2014/0297835 A1 | 10/2014 | Buys |
| 2014/0310391 A1 | 10/2014 | Sorenson, III et al. |
| 2014/0310417 A1 | 10/2014 | Sorenson, III et al. |
| 2014/0310418 A1 | 10/2014 | Sorenson, III et al. |
| 2014/0314078 A1 | 10/2014 | Jilani |
| 2014/0317261 A1 | 10/2014 | Shatzkamer et al. |
| 2014/0321278 A1 | 10/2014 | Cafarelli et al. |
| 2014/0330976 A1 | 11/2014 | van Bemmel |
| 2014/0330977 A1 | 11/2014 | van Bemmel |
| 2014/0334488 A1 | 11/2014 | Guichard et al. |
| 2014/0362682 A1 | 12/2014 | Guichard et al. |
| 2014/0365680 A1 | 12/2014 | van Bemmel |
| 2014/0366155 A1 | 12/2014 | Chang et al. |
| 2014/0369204 A1 | 12/2014 | Anand et al. |
| 2014/0372567 A1 | 12/2014 | Ganesh et al. |
| 2014/0379938 A1 | 12/2014 | Bosch et al. |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St Laurent et al. |
| 2015/0058459 A1 | 2/2015 | Amendjian et al. |
| 2015/0071285 A1 | 3/2015 | Kumar et al. |
| 2015/0085870 A1 | 3/2015 | Narasimha et al. |
| 2015/0089082 A1 | 3/2015 | Patwardhan et al. |
| 2015/0100471 A1 | 4/2015 | Curry, Jr. et al. |
| 2015/0103827 A1 | 4/2015 | Quinn et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1 | 5/2015 | Kovvali et al. |
| 2015/0127834 A1 | 5/2015 | Udupi et al. |
| 2015/0138973 A1 | 5/2015 | Kumar et al. |
| 2015/0178133 A1 | 6/2015 | Phelan et al. |
| 2015/0189009 A1 | 7/2015 | van Bemmel |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0263901 A1 | 9/2015 | Kumar et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0358850 A1 | 12/2015 | La Roche, Jr. et al. |
| 2015/0365324 A1 | 12/2015 | Kumar et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1 | 1/2016 | Mukherjee et al. |
| 2016/0062786 A1 | 3/2016 | Meng et al. |
| 2016/0094389 A1 | 3/2016 | Jain et al. |
| 2016/0094398 A1 | 3/2016 | Choudhury et al. |
| 2016/0094453 A1 | 3/2016 | Jain et al. |
| 2016/0094454 A1 | 3/2016 | Jain et al. |
| 2016/0094455 A1 | 3/2016 | Jain et al. |
| 2016/0094456 A1 | 3/2016 | Jain et al. |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0099853 A1 | 4/2016 | Nedeltchev et al. |
| 2016/0099864 A1 | 4/2016 | Akiya et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1 | 6/2016 | Jalan et al. |
| 2016/0164780 A1 | 6/2016 | Timmons et al. |
| 2016/0164914 A1 | 6/2016 | Madhav et al. |
| 2016/0182378 A1 | 6/2016 | Basavaraja et al. |
| 2016/0188355 A1* | 6/2016 | Cao ............... G06F 9/45558 718/1 |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1 | 1/2017 | Basavaraja et al. |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1 | 5/2017 | Mutnuru |
| 2017/0163531 A1 | 6/2017 | Kumar et al. |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Al-Haj, et al., "A Formal Approach for Virtual Machine Migration Planning," 9th International Conference on Network and Service Management (CNSM), Oct. 14-18, 2013, Zurich, Switzerland; 8 pages.
Changbin, et al., "Cologne: A Declarative Distributed Constraint Optimization Platform," University of Pennsylvania, Department of Computer and Information Science, Jan. 1, 2012, 14 pages.
Bari, et al., "CQNCR: Optimal VM Migration Planning in Cloud Data Centers," David R. Cheriton School of Computer Science, IEEE, Jun. 2, 2014, 9 pages.
Jain, et al., "Topology-Aware VM Migration in Bandwidth Oversubscribed Datacenter Networks," 39th International Colloquium Conference on Automata, Languages, and Programming (ICALP'12), Riga, Latvia, Jul. 9-13, 2012, 36 pages.
Wang, et al., "Virtual Machine Migration Planning in Software-Defined Networks," Tsinghua National Laboratory for Information

(56) References Cited

OTHER PUBLICATIONS

Science and Technology Department of Electronic Engineering, Tsinghua University, Dec. 16, 2014, 10 pages.
"VMware vSphere Training: Migration Hot & Cold Migration-DRS," 2015, first published on or about Aug. 2, 2014; 5 pages.
Amedro, Brian, et al., "An Efficient Framework for Running Applications on Clusters, Grids and Cloud," 2010, 17 pages.
Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10//5-benefits-of-a-storage-gateway-in-the-cloud.
Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.
Author Unknown, "A Look at DeltaCloud: The Multi-Cloud API," Feb. 17, 2012, 4 pages.
Author Unknown, "About Deltacloud," Apache Software Foundation, Aug. 18, 2013, 1 page.
Author Unknown, "Architecture for Managing Clouds, A White Paper from the Open Cloud Standards Incubator," Version 1.0.0, Document No. DSP-IS0102, Jun. 18, 2010, 57 pages.
Author Unknown, "Cloud Infrastructure Management Interface—Common Information Model (CIMI-CIM)," Document No. DSP0264, Version 1.0.0, Dec. 14, 2012, 21 pages.
Author Unknown, "Cloud Infrastructure Management Interface (CIMI) Primer," Document No. DSP2027, Version 1.0.1, Sep. 12, 2012, 30 pages.
Author Unknown, "cloudControl Documentation," Aug. 25, 2013, 14 pages.
Author Unknown, "Interoperable Clouds, A White Paper from the Open Cloud Standards Incubator," Version 1.0.0, Document No. DSP-IS0101, Nov. 11, 2009, 21 pages.
Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Baker, F., "Requirements for IP Version 4 Routers," Jun. 1995, 175 pages, Network Working Group, Cisco Systems.
Beyer, Steffen, "Module "Data::Locations?!"," YAPC::Europe, London, UK,ICA, Sep. 22-24, 2000, XP002742700, 15 pages.
Blanchet, M., "A Flexible Method for Managing the Assignment of Bits of an IPv6 Address Block," Apr. 2003, 8 pages, Network Working Group, Viagnie.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://lwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, CISCO Systems, Jan. 2012, 12 pages.
Ford, Bryan, et al., Peer-to-Peer Communication Across Network Address Translators, In USENIX Annual Technical Conference, 2005, pp. 179-192.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kumar, S., et al., "Infrastructure Service Forwarding for NSH," Service Function Chaining Internet Draft, draft-kumar-sfc-nsh-forwarding-00, Dec. 5, 2015, 10 pages.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Meraki, "meraki releases industry's first cloud-managed routers," Jan. 13, 2011, 2 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology", http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.

(56) References Cited

OTHER PUBLICATIONS

Open Stack, "Filter Scheduler," updated Dec. 17, 2017, 5 pages, accessed on Dec. 18, 2017, https://docs.openstack.org/nova/latest/user/filter-scheduler.html.

Quinn, P., et al., "Network Service Header," Internet Engineering Task Force Draft, Jul. 3, 2014, 27 pages.

Quinn, P., et al., "Service Function Chaining (SFC) Architecture," Network Working Group, Internet Draft, draft-quinn-sfc-arch-03.txt, Jan. 22, 2014, 21 pages.

Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.

Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.

Shunra, "Shunra for HP Software; Enabling Confidence in Application Performance Before Deployment," 2010, 2 pages.

Son, Jungmin, "Automatic decision system for efficient resource selection and allocation in inter-clouds," Jun. 2013, 35 pages.

Sun, Aobing, et al., "IaaS Public Cloud Computing Platform Scheduling Model and Optimization Analysis," Int. J. Communications, Network and System Sciences, 2011, 4, 803-811, 9 pages.

Szymaniak, Michal, et al., "Latency-Driven Replica Placement", vol. 47 No. 8, IPSJ Journal, Aug. 2006, 12 pages.

Toews, Everett, "Introduction to Apache jclouds," Apr. 7, 2014, 23 pages.

Von Laszewski, Gregor, et al., "Design of a Dynamic Provisioning System for a Federated Cloud and Bare-metal Environment," 2012, 8 pages.

Wikipedia, "Filter (software)", Wikipedia, Feb. 8, 2014, 2 pages, https://en.wikipedia.org/w/index.php?title=Filter_%28software%29&oldid=594544359.

Wikipedia; "Pipeline (Unix)", Wikipedia, May 4, 2014, 4 pages, https://en.wikipedia.org/w/index.php?title=Pipeline2/028Unix%29&oldid=606980114.

Ye, Xianglong, et al., "A Novel Blocks Placement Strategy for Hadoop," 2012 IEEE/ACTS 11th International Conference on Computer and Information Science, 2012 IEEE, 5 pages.

* cited by examiner

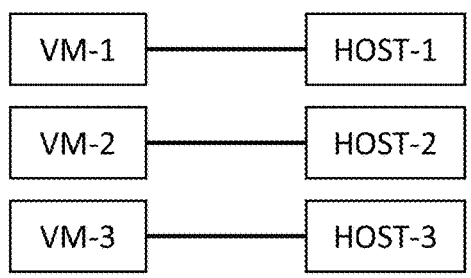
FIGURE 4
| VM Id | Requirements |
|---|---|
| VM-1 | 200 |
| VM-2 | 100 |
| VM-3 | 300 |
FIGURE 6
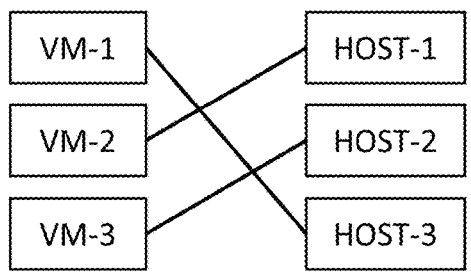
FIGURE 5
| Host Id | Initial Free Capacity |
|---|---|
| Host-1 | 100 |
| Host-2 | 200 |
| Host-3 | 100 |
FIGURE 7

TRYING TO MIGRATE VM-1 TO HOST-3

STEP 1    {1}

NOT POSSIBLE SINCE HOST-3
DOES NOT HAVE ENOUGH CAPACITY

FIGURE 8

TRYING TO MIGRATE VM-2 TO HOST-1

STEP 2    {2}

POSSIBLE SINCE HOST-1
HAS ENOUGH CAPACITY

CLOUD RESOURCE PLACEMENT OPTIMIZATION AND MIGRATION EXECUTION IN FEDERATED CLOUDS

TECHNICAL FIELD

This disclosure relates in general to the field of computing and, more particularly, to cloud resource placement optimization and migration execution in federated clouds.

BACKGROUND

Cloud computing allows cloud providers to pool a collection of physical computing devices and enables the pool of computing devices to be shared and used on demand by a plurality of tenants. Clouds can provide Infrastructure as a Service (IaaS), where virtual resources are provided in the cloud and made accessible to tenants as a service. Tenants, such as users and enterprises, can access virtual machines, virtual storage volumes, and even run applications on demand in the cloud. Cloud providers incur significant capital expenses and operating expenses when implementing and maintaining the pool of resources. Tenants and cloud providers often have high demands for performance. Accordingly, cloud providers are always looking for ways to improve the efficiency and performance of the cloud so that resources are used efficiently and in a cost-effective manner.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 shows initial virtual machine placements, according to some embodiments of the disclosure;

FIG. 5 shows desired virtual machine placements, according to some embodiments of the disclosure;

FIG. 6 shows resource requirements associated with the virtual machines, according to some embodiments of the disclosure;

FIG. 7 shows host capacities associated with physical hosts, according to some embodiments of the disclosure;

FIGS. 8-10 illustrate an example implementing a backtracking-based method for determining a sequence of migrations, according to some embodiments of the disclosure.

DETAILED DESCRIPTION OF EXAMPLE EMBODIMENTS

Overview

Figure 1:
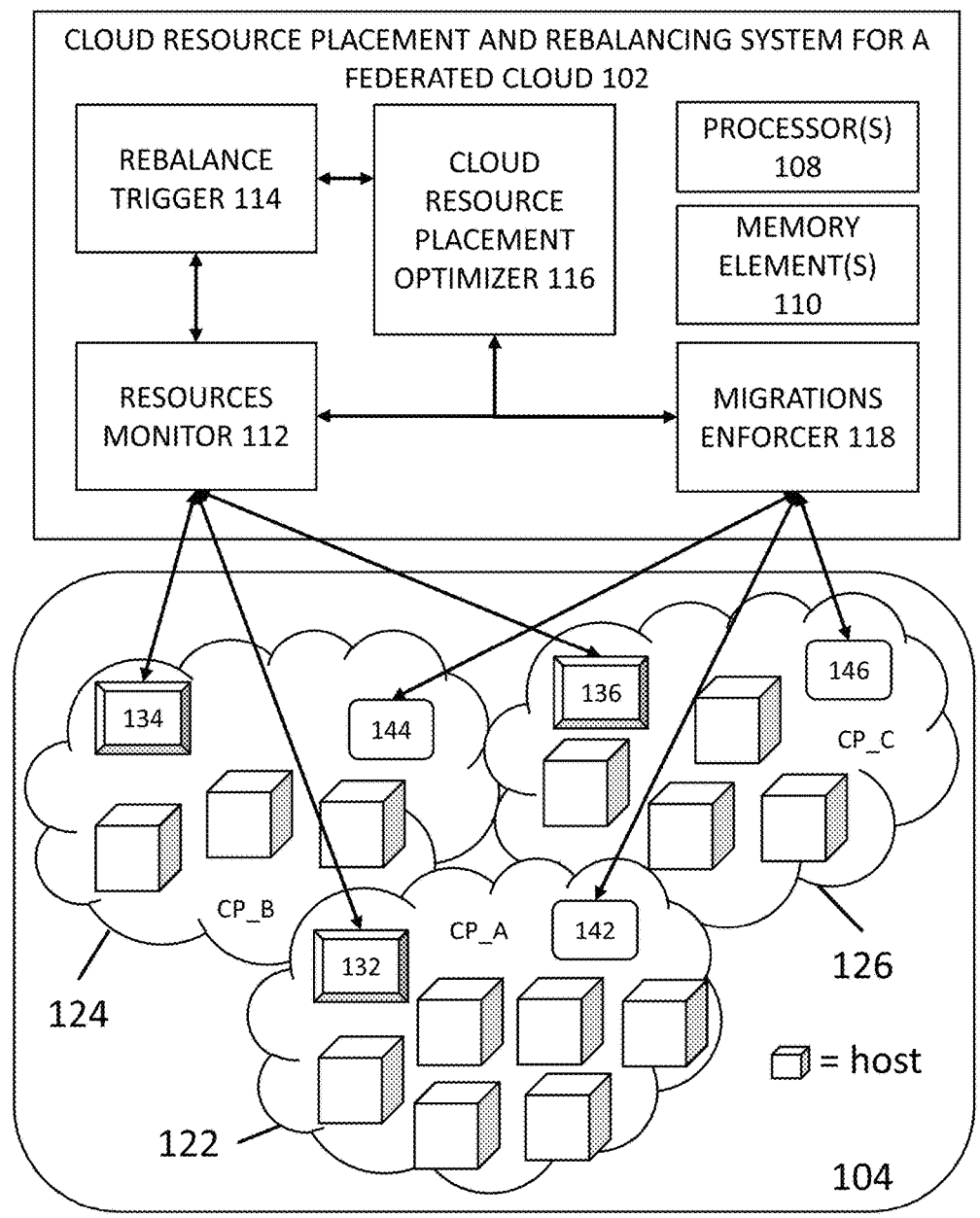
FIG. 1 shows an exemplary cloud resource placement and rebalancing system for a federated cloud and an illustrative federated cloud, according to some embodiments of the disclosure.

The present disclosure describes, among other things, a method for cloud resource placement and migration optimization for a federated cloud. A resources monitor monitors state information associated with cloud resources and physical hosts in the federated cloud having a plurality of clouds managed by a plurality of cloud providers. A rebalance trigger triggers, based on one or more conditions, a rebalancing request to initiate cloud resource placement optimization. A constraints-driven optimization cloud resource placement solver (or a cloud resource placement optimizer) determines an optimized placement of cloud resources on physical hosts across the plurality of clouds in the federated cloud based on (1) costs including migration costs, (2) the state information, and (3) constraints, wherein each physical host is identified in the constraints-driven optimization solver by an identifier of a respective cloud provider and an identifier of the physical host. A migrations enforcer determines an ordered migration plan for the optimized placement of cloud resources based on the optimized placement of cloud resources and the state information, and transmits one or more requests to place or migrate cloud resources in the plurality of clouds in the federated cloud according to the ordered migration plan. The identification mechanism for each physical host allows a global optimization solution to be determined and executed across different cloud providers.

According to one aspect, monitoring the state information in the federated cloud comprises normalizing different types of state information associated with different cloud providers to a common schema.

According to one aspect, monitoring the state information in the federated clouds comprises receiving state information from respective agents deployed in respective clouds in the federated cloud.

According to one aspect, state information comprises one or more of the following: current placements of cloud resources to physical hosts; number of cloud resources; resource requirements of cloud resources; number of workloads; number of physical hosts; capacities of physical hosts; one or more events occurred in the federated cloud; one or more alarms in the federated cloud; one or more metrics associated with application(s) running on the federated cloud; one or more metrics associated with physical hosts in the federated cloud; and one or more metrics associated with network resources in the federated cloud.

According to one aspect, state information associated with resources in the federated cloud comprises time-series information.

According to one aspect, the resources monitor can apply a predictive model on the time-series information to determine predicted state information. The one or more conditions can include the predicted state information meeting a predetermined criteria.

According to one aspect, the one or more conditions include a scheduled time condition.

According to one aspect, the one or more conditions include the state information meeting a predetermined criteria.

According to one aspect, determining the optimized placement of cloud resources comprises: (1) defining M×N number of assignment variables indicating whether a particular cloud resource is to be placed on a particular physical host, wherein M is the number of cloud resources and N is the number of available physical hosts in the federated cloud, (2) defining N×M number of cost variables indicating cost of migrating a particular cloud resource from a current physical host to another physical host in the federated cloud and/or cost of placing the particular cloud resource on a particular physical host, (3) defining constraints, in terms of the assignment variables and/or cost variables, based on one or more of the following: the state information, one or more policies, one or more business rules, one or more affinity rules, and one or more anti-affinity rules, and (4) solving for the optimized placement of cloud resources based on the constraints and an objective function in terms of the assignment variables and cost variables.

According to one aspect, the resources monitor and/or the cloud resource placement optimizer can aggregate physical hosts managed by a first cloud provider as an aggregated physical host. The cloud resource placement optimizer can defining the assignment variables and the cost variables by defining assignment variables and cost variables based on the aggregated physical host and other physical hosts managed by cloud providers different from the first cloud provider.

According to one aspect, determining the ordered migration plan comprises determining a sequence of migrations of cloud resources from source physical hosts to destination physical hosts which does not violate capacity requirements of the destination physical hosts during the sequence of migrations.

According to one aspect, determining the ordered migration plan includes: (A) determining a series of migrations from the optimized placement of cloud resources, (B) determining capacities of physical hosts and requirements of cloud resources associated cloud resources and physical hosts of the series of migrations based on the state information, and (C) executing a backtracking-based method. The backtracking-based method can include (1) determining if a current capacity of a particular destination physical host for a particular migration accommodates requirement of a particular cloud resource for the particular migration, (2) if the current capacity accommodates the requirement, adding the particular migration from the series of migrations to the ordered migration plan and updating the current capacity of the particular destination physical host and a particular source physical host for the particular migration based on the requirement, and (3) if the current capacity does not accommodate the requirement, repeat steps (1) and (2) for other migration(s) in the series of migrations which have not been added to the ordered migration plan based on current capacities of physical hosts until all migrations in the series of migrations are added to the ordered migration plan.

According to one aspect, determining the ordered migration plan comprises determining host capacities based on the state information, wherein determining the host capacities comprises aggregating state information associated with physical hosts managed by a first cloud provider as an aggregated physical host, and determining a sequence of migrations of cloud resources from source physical hosts including the aggregated physical host to destination physical hosts including the aggregated physical host which does not violate capacity requirements of the destination physical hosts including the aggregated physical host during the sequence of migrations.

Understanding Federated Clouds

Traditionally, a cloud provider manages one or more clouds, where a cloud includes a pool of physical computing devices, or referred herein as pools of physical hosts on which virtual resources can be placed. Virtual resources (referred herein as "cloud resources") can include virtual machines, virtual storage volumes, virtual platforms, virtual networks, software applications, services, workloads, and so on. Physical hosts can include physical computing devices such as servers, computer processors, computer-readable storage media, networks, network links, etc. As used herein, physical hosts can encompass one or more of the following: compute, storage, and network resources. Tenants can make requests to use the cloud, e.g., to place or access cloud resources on the physical hosts. Examples of requests from the tenants include: requesting a workload to be carried out by virtual machines in the cloud, requesting a number of virtual storage volumes to be allocated in the cloud, requesting a service on demand. The cloud provider is responsible for providing and maintaining the physical computing resources in the cloud(s) and placing virtual cloud resources on the physical computing resources as demanded by the tenants.

Generally speaking, running applications in a virtualized cloud environment such as OpenStack involves creating virtual machines (VMs) in a cluster of physical host servers (referred to as "physical hosts"). All the VMs running in the cloud share the common physical resources—compute, storage, and network. Depending on the application workload or the VM density on a physical host, sometimes it could lead to poor performing VMs because of overloading. As a way to mitigate this effect, cloud infrastructures such as OpenStack provide software support for migrating VMs from one host to another host. However in the OpenStack cloud, currently the only way to achieve migration is by letting the cloud operator manually decide which VM to migrate and to which physical host. There is no automatic support, or any guidance on the migrations. Similarly for managing the virtual storage migrations, in terms of logical volumes, or for virtual networks distribution. Managing overloading in a cloud remains a difficult task.

Recent developments in cloud computing has motivated a new type of cloud called the federated cloud (or called "cloud federation"), where clouds managed by different cloud providers are collected together to provide a common service. For instance, tenants may have cloud storage resources spread across multiple clouds (e.g., internal cloud(s) and external cloud(s), multiple internal clouds, multiple external clouds, etc.), which may be managed by different cloud providers, or even running on different platforms. Cloud providers do not always use the same platform, and application programming interfaces are generally different from one cloud provider to another. As a result, clouds managed by different cloud providers do not share resources or information with each other, since the platforms are very different and cloud providers are generally competitors against each other. Nevertheless, federation is useful for tenants because the different clouds can provide a diversity of provision and delivery of services, but cooperation or sharing of resources between clouds in the federated cloud is minimal. The different platforms can make it very difficult for cloud providers to manage the federated cloud and improve the federated cloud's efficiency. Federated clouds are not to be confused with hybrid clouds where public and private clouds managed by the same cloud operator are collected together.

For the federated cloud scenario, one or more technical goals remain to be achieved by state of the art systems:
  determining the best possible placements or migrations for cloud resources running in the cluster of physical hosts across federated cloud providers, such that the cloud cluster is balanced, without impacting the cloud resource placement requirements, as well as keeping the cost of migrations to a minimum;
  addressing issues of platform differences;
  addressing issues related to uncooperative cloud providers;
  providing suitable conditions for reactively responding and rebalancing the federated cloud;

providing a proactive way to predict when a cloud rebalance may avoid catastrophic VM failures;
providing support for triggering a periodic cloud rebalance operations; and
determining a proper migration plan to ensure rebalancing can be executed.

In one example, OpenStack live migration expects an administrator user to manually trigger the migration operation on a single VM basis, and expects the final VM destination to be specified. It fails if the destination has not enough resources to handle the migration, and expects the administrator user to manually determine if this migration is possible.

In another example, VMWare vSphere Dynamic Resource Scheduler (DRS) and Dynamic Power Management (DPM) functionality offers dynamic functionality but fails to address issues related to a federated cloud scenario. The DRS functionality handles resource demand in a cluster of hosts, by guaranteeing resources to virtual machines, and allowing for automatic migration of virtual machines during maintenance without service disruption. Depending on the automation levels provided, it provides recommendations or automatically migrates to keep the cluster load balanced and to maximize performance. It provides constraint correction abilities with support for user defined constraints such as affinity or anti-affinity requirements. The DPM functionality manages energy consumption by keeping hosts in standby mode when demand for resources is low, and powering on additional hosts when needed. While these dynamic functionalities are useful, the dynamic functionalities operate under limited conditions.

Cloud Resource Placement and Rebalancing in a Federated Cloud Environment

The solution to achieve the one or more aforementioned technical goals involves the following series of technical tasks: unified resources monitoring, comprehensive triggering for rebalancing of the federated cloud, smart placement optimization across the federated cloud, and systematic migration for carrying out the rebalancing of the federated cloud. The present disclosure describes various aspects of the system architecture and methods for implementing and carrying out these technical tasks. These tasks are designed specifically to handle the federated cloud scenario and to provide a more intelligent rebalancing triggering mechanism.

FIG. 1 shows an exemplary cloud resource placement and rebalancing system for a federated cloud 102 and an illustrative federated cloud 104, according to some embodiments of the disclosure. In this example, the federated cloud 104 comprises three clouds or three clusters of physical hosts: a first cloud 122, a second cloud 124, and a third cloud 126. The three clouds are managed by different cloud providers. For purposes of illustration, the first cloud 122 is managed by cloud provider A ("CP_A"). The second cloud 124 is managed by cloud provider B ("CP_B"). The third cloud 126 is managed by cloud provider C ("CP_C"). Each cloud may have different number of physical hosts, and a number of cloud resources may already be placed (or allocated) in the physical hosts. The cloud resource placement and rebalancing system for a federated cloud 102 includes one or more memory elements 110 (e.g., non-transitory computer readable storage medium), one or more processors 108 coupled to the one or more memory elements 110. The system 102 can further include resources monitor 112, a rebalance trigger 114, cloud resource placement optimizer 116, and migrations enforcer 118. Instructions stored on one or more memory elements 110 can be executed by one or more processors 108 to carry out or provide functionalities associated with parts including one or more of: resources monitor 112, a rebalance trigger 114, cloud resource placement optimizer 116, and migrations enforcer 118. These parts that when executed by the at least one processor are configured to carry out or provide functionalities described herein. The functionalities and data flow of these parts are described in greater detail in later sections of the present disclosure.

To obtain information about the state of the three clouds, resources monitor 112 can be communicably connected to respective agents deployed in respective clouds in the federated cloud 104. A first agent 132 is deployed in the first cloud 122. A second agent 134 is deployed in the second cloud 124. A third agent 136 is deployed in the third cloud 126. Each agent for a respective cloud provides an interface which can respond to requests from the resources monitor 112 for state information associated with the respective cloud and/or push state information associated with the respective cloud to the resources monitor 112.

The resources monitor 112 can communicate with rebalance trigger 114, cloud resource placement optimizer 116, and migrations enforcer 118, e.g., to provide state information. Rebalance trigger 114 can communicate with cloud resource placement optimizer 116 to signal when to rebalance the federated cloud.

To execute migrations according to an optimized placement of cloud resources determined by cloud resource placement optimizer 116, migrations enforcer 118 can be communicably connected to respective services deployed in respective clouds in the federated cloud 104. A first service 142 is deployed in the first cloud 122. A second service 144 is deployed in the second cloud 124. A third service 146 is deployed in the third cloud 126. Typically, each service for a respective cloud is provided by the cloud provider to allow requests to be made by tenants to use the cloud, e.g., to allocate X number of cloud resources in the cloud, to move a cloud resource from one host to another host. These services can receive requests to place or migrate cloud resources from the migrations enforcer 118 to implement migrations for rebalancing the federated cloud.

The cloud resource placement and rebalancing system for a federated cloud 102 provides an intelligent system for rebalancing the clouds even if they are managed by different cloud providers. Resources monitor 112 can keep track of the state of the federated cloud including, e.g., information relating to existing cloud resources and physical hosts, consumption and/or utilization information, behavior of workloads, etc. Through a comprehensive framework defined by the system 102, rebalance trigger 114 can determine when rebalancing should occur. To rebalance the federated cloud, cloud resource placement optimizer 116 can determine an optimized placement of cloud resources across the clouds. Migrations enforcer 118 can determine an ideal order in which migrations are to be executed.

Exemplary Method for Cloud Resource Placement and Migration Optimization for a Federated Cloud Involving a Global Namespace to Treat the Federated Cloud as a Single Cloud Many state of the art migrations schemes do not address how to rebalance a federated cloud to actively prevent overloading of resources in the federated cloud. Treating the clouds managed by different cloud providers as a single cloud, a global optimization can be applied to determine effectively determine the optimized or improved placements or migrations for cloud resources across the clouds, such that the federated cloud as a whole is balanced. The global optimization can ensure cloud resource placement requirements are met, as well as keep the cost of migrations to a minimum by defining a proper objective function.

Figure 2:
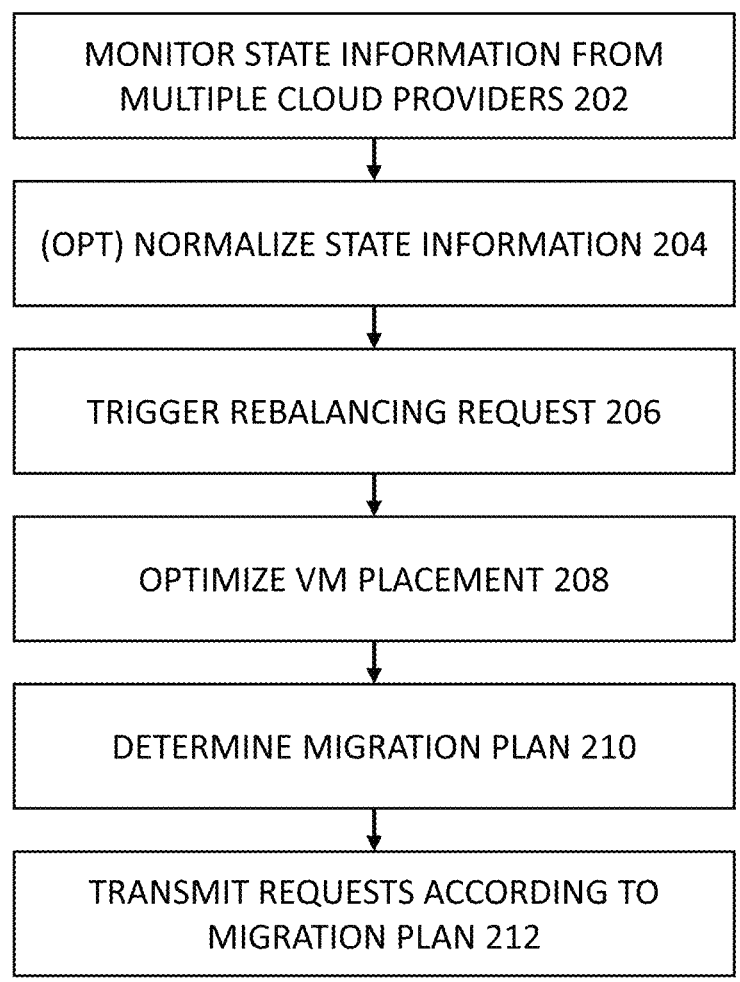
FIG. 2 is a flow diagram illustrating a method for cloud resource placement and migration optimization for a federated cloud, according to some embodiments of the disclosure.

FIG. 2 is a flow diagram illustrating a method for cloud resource placement and migration optimization for a federated cloud, according to some embodiments of the disclosure. The method is being described in conjunction with the parts illustrated in FIG. 1. Details related to various tasks of the method are described in later sections of the present disclosure.

Resources monitor 112 can monitor state information associated with cloud resources and physical hosts in the federated cloud having a plurality of clouds managed by a plurality of cloud providers (task 202). Resources monitor can optionally normalize the state information from different cloud providers (task 204). Rebalance trigger 114 can trigger, based on one or more conditions, a rebalancing request to initiate cloud resource placement optimization (task 206). A constraints-driven optimization solver of cloud resource placement optimizer 116 can determine an optimized placement of cloud resources on physical hosts (task 208) across the plurality of clouds in the federated cloud based on (1) costs (in some cases including migration costs), (2) the state information, and (3) constraints, wherein each physical host is identified in the constraints-driven optimization solver by an identifier of a respective cloud provider and an identifier of the physical host. Migrations enforcer 118 can determine an ordered migration plan for the optimized placement of cloud resources based on the optimized placement of cloud resources and the state information (task 210). Migrations enforcer 118 can transmit one or more requests to place or migrate cloud resources in the plurality of clouds in the federated cloud according to the ordered migration plan (task 212).

For task 208, a distinguishing feature involves identifying each physical host in the constraints-driven optimization solver by an identifier of a respective cloud provider and an identifier of the physical host. For cloud provider A's Host_1's identifier used by the optimization solver can be prefixed with an identifier to indicate the location or corresponding cloud provider by specifying the host as "CP_A: Host_1". As a result, each physical host across the federated cloud can be treated as part of a single cloud and a global optimization can be applied across the federated cloud. The namespace ensures the cloud resource placement and rebalancing system for a federated cloud can identify to which cloud provider a host belongs. Furthermore, the namespace abstraction allows the global optimization to be performed without requiring the cloud providers to change their respective clouds, interfaces, or application programming interfaces. An optimization solver can optimize placement and migrations for multiple clouds across the federated cloud as if it is performing the optimization for a single cloud. The namespace abstraction allows the migrations enforcer to transmit requests to the correct cloud provider(s) to execute migrations.

The namespace can be used across different parts of the cloud resource placement and rebalancing system 102. Resources monitor 112 can associate state information to different hosts using the namespace. Variables and optimized placements in the cloud resource placement optimizer 116 can use the namespace. Migrations enforcer can resolve the namespace to generate requests to the appropriate cloud provider when executing migrations.

Figure 3:
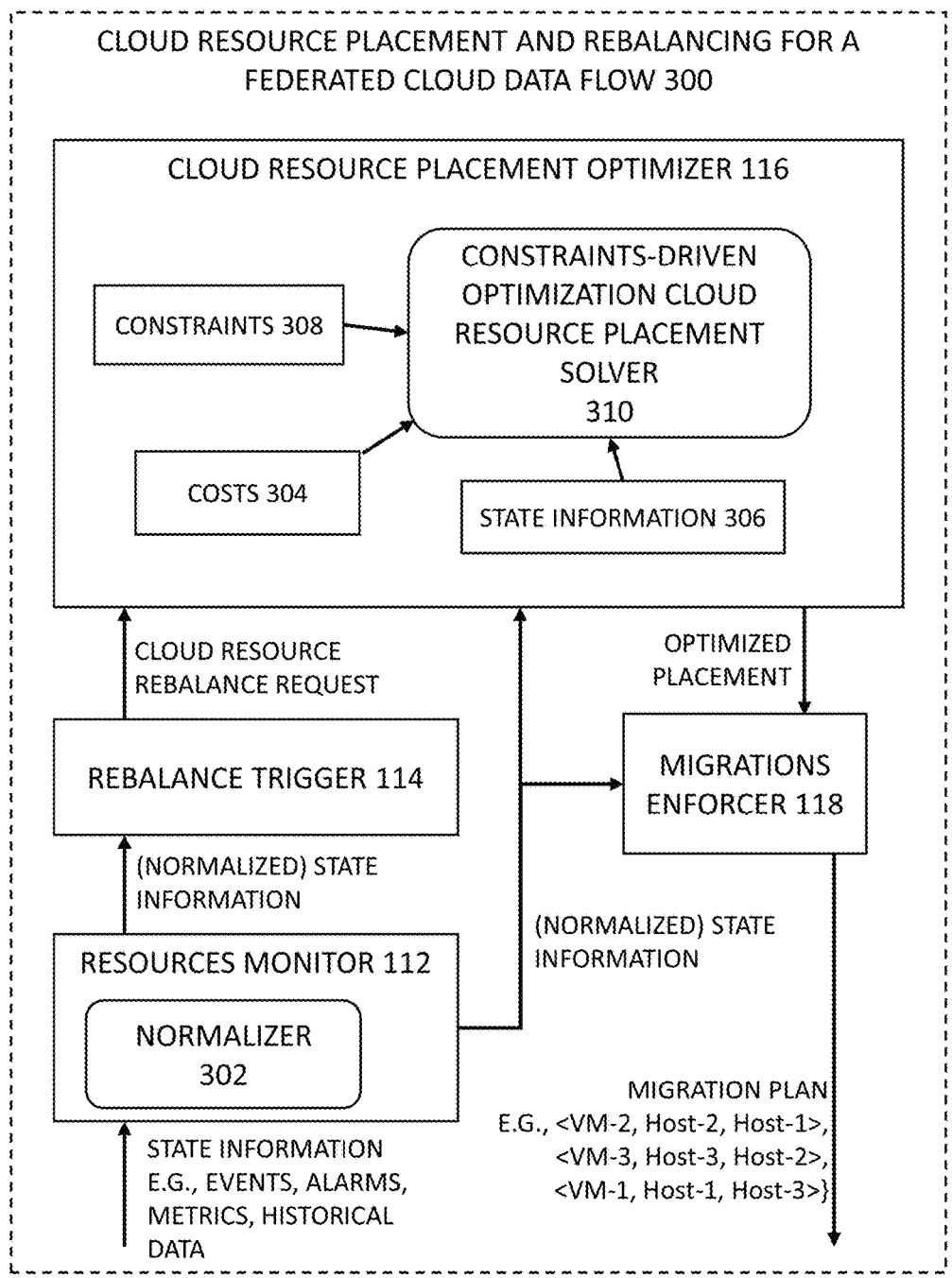
FIG. 3 is an illustration of federated cloud resource placement and rebalancing data flow, according to some embodiments of the disclosure.

FIG. 3 is an illustration of federated cloud resource placement and rebalancing data flow, according to some embodiments of the disclosure. The data flow between different parts of the cloud resource placement and rebalancing system further clarifies the functionalities of the parts illustrated in FIG. 1 and tasks illustrated by FIG. 2. Each part of the cloud resource placement and rebalancing system and their respective functionalities are described in greater detail in the following sections.

Unified Resources Monitoring in the Federated Cloud Scenario

Resources monitor 112 can monitor state information associated with cloud resources and physical hosts in the federated cloud having a plurality of clouds managed by a plurality of cloud providers (task 202 of FIG. 2). As illustrated in FIG. 3, resources monitor 112 can receive state information, which may include one or more of the following: current placements of cloud resources to physical hosts, number of cloud resources, requirements of cloud resources; number of physical hosts, capacities of physical hosts; number of workloads, one or more events occurred in the federated cloud, one or more alarms in the federated cloud, one or more metrics associated with application(s) running on the federated cloud, one or more metrics associated with physical hosts in the federated cloud, and one or more metrics associated with network resources in the federated cloud.

In terms of applications running on the federated cloud, some metric examples include: application latency/response times, transactions rate, etc. Physical host metric examples include: CPU usage, memory (RAM) usage, disk usage, network utilization, network resource metrics such as packets read/write rates, etc. Some of these host metrics can be captured even for the cloud resources such as virtual machines, virtual storage volumes, etc.

Because the clouds are managed by different cloud providers, there is generally no centralized entity which has state information for all the clouds, accordingly, resources monitor 112 is provided to receiving state information from respective agents deployed in respective clouds in the federated cloud. Resources monitor 112 can collect and monitor measurable state information, including metrics from the underlying cloud infrastructure, e.g., the first cloud 122, the second cloud 124, and the third cloud 126, by communicating with the cloud infrastructures components and services, e.g., the first agent 132, the second agent 134, and the third agent 136.

For example, in OpenStack clouds, there is a service called Ceilometer, which publishes periodic metrics such as Computer Processing Unit (CPU) Utilization, Memory Utilization, and other usage metrics associated with the cloud. Resources monitor 112 can talk to these kind of services (referred here in as "agents"), and also some (native) monitoring agents running on the hosts, to gather and consolidate all the data. Advantageously, resources monitor 112 in a federated cloud scenario can receive and maintain monitorable data from the clouds managed by all the different cloud providers, and ensures it can appropriately process the information to make decisions for each of the clouds. As used herein, agents can include any one or more of the above entities or other suitable entities which can report state information to the resources monitor 112; agents are computer-implemented services or devices associated with the clouds. The agents can be implemented in the physical hosts. The agents can be implemented in the cloud resources (e.g., as a service running on a virtual machine). The agents can be implemented in applications running in the cloud (e.g., as a part of the application).

When clouds are managed by different cloud providers, certain types of state information may not always be available. In some cases, even when the type of state information is available, the format and/or terminology of the state information may not be the same across the clouds managed by different service providers. To address this issue, resources monitor 112, include a normalizer 302 to normalize the state information from different cloud providers (task 204 of FIG. 2). The normalizer 302 can normalizing different types of state information associated with different cloud providers to a common schema. Once the state information is normalized, the (normalized) state information as illustrated in FIG. 3 can then be provided to and used by other parts of the cloud resource placement and rebalancing system 102 (e.g., rebalance trigger 114, cloud resource placement optimizer 116, and migration enforcer 118).

Comprehensive Triggering for Rebalancing of the Federated Cloud

Rebalance trigger 114 can trigger, based on one or more conditions, a rebalancing request to initiate cloud resource placement optimization (task 206 of FIG. 2). As illustrated in FIG. 3, rebalance trigger 114 can receive (normalized) state information from resources monitor 112 to check one or more conditions and decide whether rebalancing is needed. To avoid overloading issues in a federated cloud, resources monitor 112 monitors state information, e.g., metrics for workloads, and the rebalance trigger 114 can check the state information against one or more conditions to assess whether rebalancing is needed for the federated cloud. For instance, when workloads are running, rebalance trigger 114 can take into account time-series data on CPU, memory, disk utilization. The time-series data can indicate whether a host is overloaded, or even whether a virtual machine itself is overloaded. In another example, rebalance trigger 114 can take into account of network load for transfers to a host's interface, which can also indicate whether a host is overloaded and whether a virtual machine needs to be migrated elsewhere. In yet another example, rebalance trigger 114 can take into account an application-level metric (for an application running on a VM), such as a web server running on a virtual machine. For instance, rebalance trigger 114 can take into account whether the application has a slow response time, to determine whether rebalancing is needed.

Rebalance trigger 114 can determine a rebalancing of the federated cloud is desirable or needed using one or more of these modes: reactive triggering, proactive triggering, and scheduled triggering. Any of these modes includes one or more conditions for triggering a cloud resource rebalance request to be transmitted to the cloud resource placement optimizer 116. The modes provide a comprehensive scheme for intelligently triggering a rebalancing of the federated cloud for a variety of situations (i.e., based one on or more conditions, e.g., as specified by an administrator of the federated cloud).

For reactive triggering, rebalance trigger 114 can respond to events or alarms notifications from the clouds in the federated cloud. For instance, rebalance trigger 114 can implement rules and/or threshold checkers that monitor certain types of state information. In some embodiments, the rebalance trigger 114 can assess whether the state information meets a predetermined criteria (e.g., rules, threshold checks). In some embodiments, the rebalance trigger 114 can assess whether a certain alarm went off and/or event has occurred. The types of state information, the rules, and/or threshold checkers can be configured by an administrator. Example events or alarm notifications from the clouds may include one or more of the following: host failing events (typically indicating a cloud resource on the host needs to be migrated), some other alarms that are configured in the infrastructure service directly, etc. In some embodiments, Ceilometer service in OpenStack supports triggering alarms based on values of some metrics, and such alarms can be used for the rebalance trigger 114 to reactively trigger rebalancing of the federated cloud. In some cases, rebalance trigger 114 can assess state information at the cloud resource level, e.g., based on virtual machine specific performance metrics. With the help of monitoring agents running in the virtual machines directly, rebalance trigger 114 can measure the application performance and if the application performance is deteriorating, e.g., when a virtual machine migration might benefit.

For proactive triggering, rebalance trigger 114 predicts can predict the performance of the cloud, and use predicted state information to determine if one or more criteria has been met for triggering a rebalancing of the federated cloud. The performance of the cloud can include performance information at one or more levels including: at the network level, at the physical host level, at the cloud resource level, and/or at the application level. Typically, rebalance trigger 114 monitors state information to determine performance of the cloud (i.e., performance of the resources in the cloud). The state information associated with cloud resources and physical hosts in the federated cloud can include time-series information. Rebalance trigger 114 can apply a predictive model on the time-series information to determine predicted state information, and determine whether the predicted state information meets one or more of the predetermined criteria (e.g., based on rules and/or threshold checks). Predictive models can include advanced techniques such as Holt-Winters model, autoregressive integrated moving average (ARIMA) model, and any suitable time-series analysis and prediction model. Effectively, rebalance trigger 114 can determine when it is appropriate or needed, e.g., to rebalance the federated cloud to prevent overloading, to perform a migration for the current workload, etc. Rebalance trigger 114 leverages a unified resources monitor 112, which continuously monitors state information associated with the cloud resources and physical hosts in the federated cloud. Based on the state information, rebalance trigger 114 can apply special data analysis techniques such as forecasting to study demand, loads, usage behavior, etc. to determine predicted state information. The predicted state information can then be used as a basis for triggering a cloud resource rebalance request to be transmitted to cloud resource placement optimizer 116. For instance, based on N number of time-series data points of a particular metric, it is possible to predict the value of the metric using a suitable predictive model. If the predicted value of the particular metric exceeds a threshold, rebalance trigger 114 can trigger a cloud resource rebalance request. Advantageously, rebalance trigger can proactively rebalance the federated cloud to avoid any downtimes and performance degradations. For instance, rebalance trigger 114 can execute predictive machine learning algorithms on state information (e.g., metrics in time-series format, and usage behaviors based on the historical data collected from the cloud infrastructure), and take decisions to rebalance the federated cloud proactively. In some cases, anomalies detected using an anomaly detection algorithms can also be used as a basis for determining whether to trigger a rebalance request to avoid failures.

For scheduled triggering, rebalance trigger 114 may include one or more timers. Based on a scheduled time condition, rebalance trigger 114 can trigger a cloud resource rebalance request to be transmitted to cloud resource placement optimizer. Examples of scheduled time conditions may include: periodic maintenance window support, scheduled maintenance, periodic scheduled rebalancing, etc.

Smart Placement Optimization Across the Federated Cloud

A constraints-driven optimization cloud resource placement solver of cloud resource placement optimizer 116 can determine an optimized placement of cloud resources on physical hosts (task 208 of FIG. 2) across the plurality of clouds in the federated cloud. As illustrated in FIG. 3, cloud resource placement optimizer 116 includes constraints-driven optimization resource placement solver 310. For the federated cloud scenario, the solver effectively combines the resources from all the clouds managed by different cloud providers and forms a single cloud, i.e., a common resource pool. For instance, suppose the federated cloud has two clouds: a local cloud and an external cloud. The resource of external cloud could be seen as some additional capacity of local cloud. The external cloud can be modeled as one or more additional hosts to the local cloud with available capacity and associated costs. By aggregating the resources from different cloud providers, the constraints-driven optimization cloud resource placement can work across physical hosts from different clouds managed by different cloud providers. Each physical host is identified in the constraints-driven optimization solver by an identifier of a respective cloud provider and an identifier of the physical host. As previously explained, the namespace ensures the cloud resource placement and rebalancing system for a federated cloud can identify to which cloud provider a host belongs, and the namespace abstraction allows the global optimization to be performed without requiring the cloud providers to change their respective clouds, interfaces, or application programming interfaces.

The constraints-driven optimization cloud resource placement solver 310 determines a balanced and optimized set of new placements of cloud resources (e.g., virtual machines, storage, network) while ensuring the set of new placements satisfy requirement(s) of the various cloud providers. In other words, the optimized placement of cloud resources on physical hosts across the plurality of clouds aim to keep the clouds balanced, increase performance, and ensure user requested placement constraints are satisfied.

Some examples herein are related to virtual machine placement and virtual machine migrations. These examples are serve to illustrate how the constraints-driven optimization cloud resource placement solver 310 operates; these examples are not meant to be limiting. The present disclosure encompasses other types of placements involving other types of cloud resources, such as storage resources and network resources. To rebalance the federated cloud, the solver 310 tries to find an optimized placement of virtual machines by solving optimal placements as if the existing virtual machines are new requests for virtual machines to be placed in the cloud. In one example, the solver 310 determines an optimal placement for each virtual machine (i.e., which physical host is best for hosting the virtual machine), by taking the following into consideration:

consider all the existing virtual machines as a new request of virtual machines with their specific demand of resources;

consider the physical hosts as available (as if it was a fresh start);

consider all the existing virtual machines constraints, e.g., special requirements in terms of policies, business rules, affinity/anti-affinity requirements, or any other special constraints virtual machines had when they were initial placed;

minimize cost, including cost of migration, e.g., the number of migrations;

maximize the cloud rebalancing and performance impact, in terms of the final values of a set of cloud metrics after the resulting new distribution.

As illustrated in FIG. 3, the constraints-driven optimization cloud resource placement solver determines an optimized placement of cloud resources based on (1) costs 304, (2) state information 306, and (3) constraints 308. When optimizing placement of cloud resources in a federated cloud, special considerations are given to (1) costs 304, (2) state information 306, and (3) constraints 308 (when compared with optimizations performed for a single cloud), since migrating cloud resources across clouds managed by different cloud providers is different from migrating cloud resources within a single cloud.

Special set of costs are considered by the solver 310 in the federated cloud scenario. Examples of costs 304 can include: the cost for a particular physical host hosting a particular virtual resource, the cost of running in a federated cloud (e.g., comparing cloud A vs cloud B using a cost matrix with effective cost of running in each of the clouds available for federation), cost of migration, etc. In particular, examples of cost of migration can include: a number of physical hosts running/utilized after all migrations, number of migrations (and associated costs), time required for executing migrations, amount of data transfer required for executing migrations, the cost of migrating a cloud resource from a source cloud provider to a destination cloud provider.

As explained previously, state information 306 for the solver 310 utilizes the namespace to identify which cloud provider a physical host is located, and the state information across the clouds are unified and optionally normalized by resource monitor 112.

Special set of constraints can be taken into account in the federated cloud scenario. Examples of constraints 308 can include: geo-location-based policies, tenant-specific requirements in terms of what clouds are allowed or not allowed, resource-based constraints in terms of capabilities in the clouds managed by different cloud providers, etc.

In some embodiments, the solver 310 can determine the optimized placement of cloud resources by setting up a constraints-driven optimization problem. The solver 310 can define M×N number of assignment variables indicating whether a particular cloud resource is to be placed on a particular physical host, wherein M is the number of (existing) cloud resources and N is the number of available physical hosts in the federated cloud. An assignment variable can be a binary variable, whose value indicates whether a particular virtual resource is to be placed on a physical host. The solver 310 can define N×M number of cost variables indicating cost of migrating a particular cloud resource from a current physical host to another physical host in the federated cloud and/or cost of placing the particular cloud resource on a particular physical host. The solver 310 can define constraints, in terms of the assignment variables and/or cost variables, based on one or more of the following: the state information, one or more policies, one or more business rules, one or more affinity rules, and one or more anti-affinity rules. Constraints can be mathematically defined in terms of the assignment variables and/or cost variables. For instance, one constraint can specify that the sum of all assignment variables must equal to the number of (existing) cloud resources. In another instance, one constraint can specify that the required/requested amount of resources for particular cloud resource(s) to be placed on a particular physical host must not exceed the available capacity of a particular physical host. The solver 310 can solve for the optimized placement of cloud resources based on the constraints and an objective function in terms of the assignment variables and cost variables. Specifically, the solver 310 searches through possible placements to find an optimal placement of cloud resources which can optimize the objective function. The objective function can be a cost function which takes into account of the total cost of placing the cloud resources and the total cost of needed migrations. The solver 310 would find an optimal placement which minimizes the cost function while ensuring constraints are satisfied. The objective function can be a utility function which rewards performance and/or placements which involve less migrations. The solver 310 would find an optimal placement which maximizes the utility function while ensuring constraints are satisfied. Any suitable constraints-driven optimization solver can be used. The result generated by the solver 310, i.e., the optimized placement of cloud resources, includes mapping of each cloud resource to a particular physical host. The optimized placement of cloud resources is transmitted to migrations enforcer 118.

Systematic Migration for Carrying Out the Rebalancing of the Federated Cloud

Based on the optimized placement from cloud resource placement optimizer 116, migrations enforcer 118 determines an (unordered) series of migrations. Depending on the optimized placement of cloud resources, one or more existing cloud resources may be assigned to its current physical host (i.e., the physical host on which the cloud resource is currently placed) and one or more existing cloud resources may be assigned to a physical host different from its current physical host. When a cloud resource is assigned to a physical host different from its current physical host, a migration is needed. The series of migration(s) includes one or more such migrations. In an example dealing with migrating virtual machines, the series of migrations includes a set of all required migrations involving virtual machines migrating from their source physical hosts to a new destination physical hosts. A migration can be represented as a tuple, e.g., <VM, Cloud_Provider:Host_source, Cloud_Provider: Host_destination>, indicating that the virtual machine VM is to be migrated from source host Cloud_Provider:Host_source to the destination host Cloud_Provider:Host_destination. For instance, if currently VM_1 was in Cloud_Provider_A:Host_1, and the optimized placement requiring VM_1 to be in Cloud_Provider_B:Host_4, a migration is required for VM_1 from Cloud_Provider_A:Host_1 to Cloud_Provider_B:Host_4. This migration can be represented step as a tuple <VM_1, Cloud_Provider_A:Host_1, Cloud_Provider_B:Host_4>. A series of migrations can include a set of such tuples {<VM_1, Cloud_Provider_A: Host_1, Cloud_Provider_B:Host_4>, <VM_4, Cloud_Provider_B:Host_2, Cloud_Provider_A:Host_2>, <VM_7, Cloud_Provider_A:Host_3, Cloud_Provider_A:Host_4> . . . }

With the series of migrations, the migrations enforcer 118 can communicate with services in respective clouds to enable the migrations. For instance, for virtual machine migrations in OpenStack Clouds, the migrations enforcer 118 can communicate migration request to compute service Nova, and use the Nova virtual machine live migration application programming interfaces, to trigger the migrations. In some cases, after some cloud resource migrations are executed, the resources of a physical host may get used up completely, even if there were additional migrations that would free up the physical host. This situation happens because the cloud resource placement optimizer 116 determines a "global" solution, and doesn't determine a migration plan. To address this issue, migrations enforcer 118 can determine an ordered migration plan for the optimized placement of cloud resources based on the optimized placement of cloud resources the state information (task 210 of FIG. 2). Determining an ordered migration plan (from the series of migrations) includes determining a sequence of migrations of cloud resources from source physical hosts to destination physical hosts which does not violate capacity requirements of the destination physical hosts during the sequence of migrations. Migration enforcer 118 can implement a method which ensures there is capacity for each physical host during the sequence of migrations as each cloud resource is migrated one by one. Specifically, migration enforcer 118 solves for a valid ordered migration plan to migrate cloud resources one by one to achieve the final optimized placement of cloud resources from the cloud resource placement optimizer 116. After the migration plan is determined, migrations enforcer 118 can transmit one or more requests to place or migrate cloud resources in the plurality of clouds in the federated cloud according to the ordered migration plan (task 212 of FIG. 2).

To illustrate, FIGS. 4-10 outlines executing the method for determining a sequence of migrations, i.e., the migration plan, in a simplified example. The simplified example involves three virtual machines (VM-1, VM-2, and VM-3) and three physical hosts (HOST-1, HOST-2, and HOST-3). FIG. 4 shows initial virtual machine placements, according to some embodiments of the disclosure. VM-1 is placed on HOST-1. VM-2 is placed on HOST-2. VM-3 is placed on HOST-3. Suppose the constraints-driven optimization cloud resource placement solver determines an optimized placement, referred to as the "desired virtual machine placements". FIG. 5 shows desired virtual machine placements, according to some embodiments of the disclosure. VM-1 is to be placed on HOST-3. VM-2 is to be placed on HOST-1. VM-3 is to be placed on HOST-2. In this example, all virtual machines are being migrated. The series of migrations can be represented as {<VM-1, Host-1, Host-3>, <VM-2, Host-2, Host-1>, <VM-3, Host-3, Host-2>}. The series of migrations is not ordered. FIG. 6 shows resource requirements associated with the virtual machines, according to some embodiments of the disclosure. VM-1 requires 200 units of resources. VM-2 requires 100 units of resources, VM-3 requires 300 units of resources. FIG. 7 shows host capacities associated with physical hosts, according to some embodiments of the disclosure. The physical host capacities are initial (free) capacities of the physical hosts (amount of resources available when the virtual machines are still in their initial virtual machine placements). VM-1 has 100 units of resources. VM-2 requires 200 units of resources, VM-3 requires 100 units of resources.

Determining the ordered migration plan can include determining a series of migrations from the optimized placement of cloud resources. Furthermore, determining the ordered migration plan includes determining capacities of physical hosts (e.g., FIG. 7) and requirements of cloud resources (e.g., FIG. 6) associated cloud resources and physical hosts of the series of migrations based on the state information. Migration enforcer 118 can execute a backtracking-based method to determine the ordered migration plan based on the series of migrations and associated state information.

In some embodiments, the backtracking-based method includes: (1) determining if a current capacity of a particular destination physical host for a particular migration accommodates requirement of a particular cloud resource for the particular migration, (2) if the current capacity accommodates the requirement, adding the particular migration from the series of migrations to the ordered migration plan and updating the current capacity of the particular destination physical host and a particular source physical host for the particular migration based on the requirement, and (3) if the current capacity does not accommodate the requirement, repeat steps (1) and (2) for other migration(s) in the series of migrations which have not been added to the ordered migration plan based on current capacities of physical hosts until all migrations in the series of migrations are added to the ordered migration plan. The backtracking-based method can return an ordered migration plan, i.e., an ordered sequence of migrations, if a valid sequence exists. The backtracking-based method avoids random migration and determines a concrete and valid series of migrations to be executed. After an ordered migration plan is determined, migration enforcer 118 can communicate to respective services of the respective clouds (e.g., cloud Infrastructure application programming interfaces such as the OpenStack Nova migration application programming interface to trigger the migrations one by one in the order as specified by the ordered migration plan. The following is pseudocode for the backtracking-based method which recursively backtracks ordering of migrations if a capacity requirement is violated.

```
Variable Description
    1.  current_hosts_capacity : Existing Host Capacity
    2.  current_vm_host_mapping : Current VM to its Host mapping
    3.  proposed_migration_plan : The new set of proposed migration
        mappings of the form { <VM-i, Host_source, Host_destination>,.... }
        as a result of the cloud rebalancing
    4.  vm_requirement : Resource requirements of the VM
Order = [ ]
        bool  FindOrder(current_hosts_capacity,  current_vm_host_
        mapping, proposed_migration_plan, vm_requirement):
If all new hosts mapping have been ordered:
        return success
For each mapping i in proposed_migration_plan:
        v = VM in mapping i
        new_host = Host to which v is mapped
        curren_host = current_vm_host_mapping[v]
        If mapping [i] not in Order:
            if Host new_host has enough capacity for VM v:
                // Update old and new host
                Consume vm_requirement[v] capacity from new_host
                Add capacity to current_host
                // Update current_mapping
                Change current_host to new_host
                // Append to order
                Append mapping to Order
                //Make recursive call
                result    =    FindOrder(current_hosts_capacity,
                current_vm_host_mapping,    proposed_migration_plan,
                vm_requirement)
                if result is True:
                    return True
                else:
                    // Revert the changes made before recursive call
                    Revert current_mapping[v] to its old mapping
                    Revert capacity changes
                    Remove this mapping from order
// backtrack to earlier level of recursion since none of new mapping could
lead a
// successful ordering
return False
```

Figure 10:
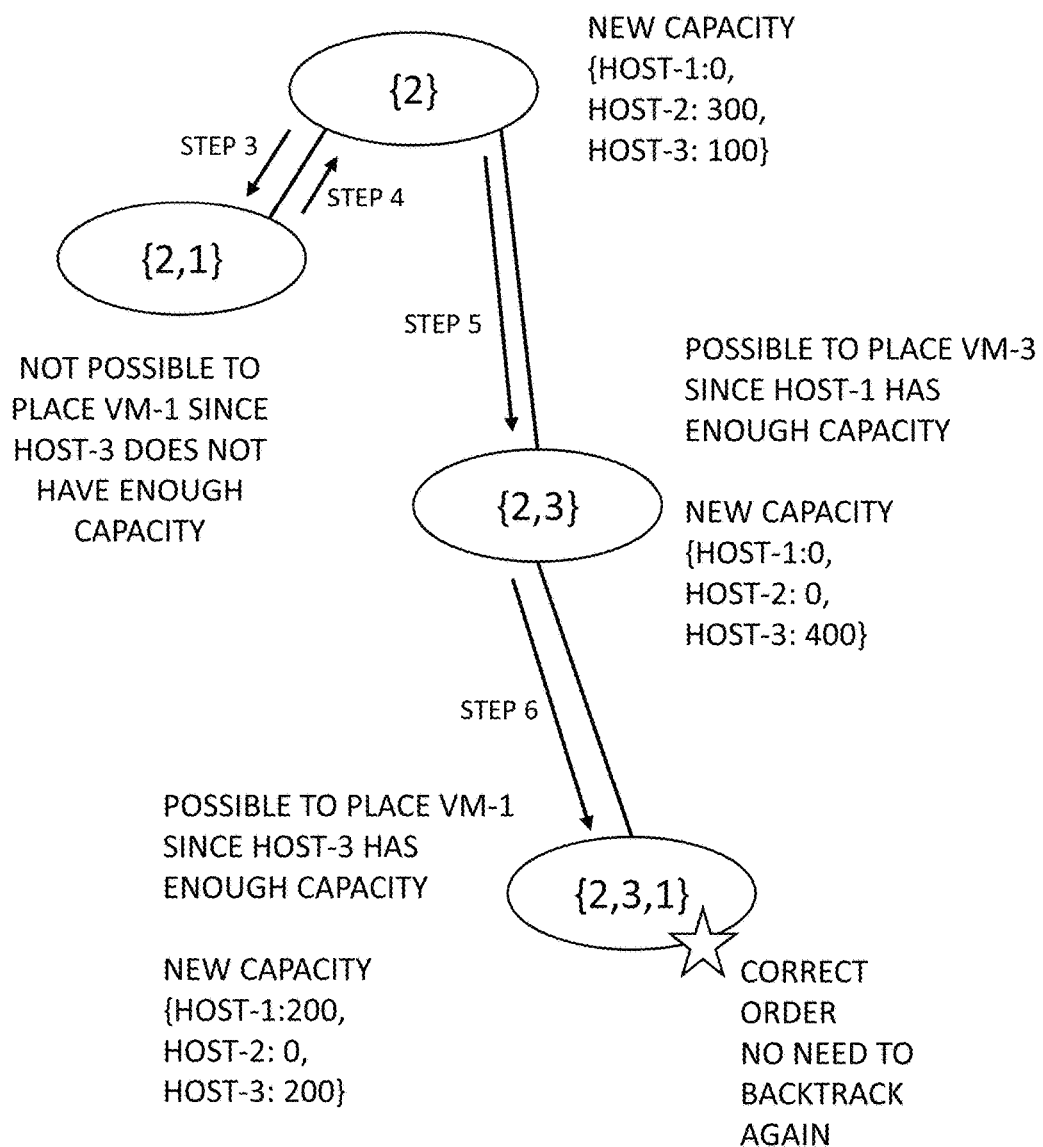

FIGS. 8-10 illustrate an example implementing a backtracking-based method for determining a sequence of migrations, according to some embodiments of the disclosure. Using the same example as before, the series of migrations is represented by {<VM-1, HOST-1, HOST-3>, <VM-2, HOST-2, HOST-1>, <VM-3, HOST-3, HOST-2>}. In FIG. 8, the method tries to migrate VM-1 from HOST-1 to HOST-3, but HOST-3 having a current capacity of 100 units of resources cannot accommodate VM-1, which requires 200 units of resources. The method backtracks to try a different virtual machine migration in the series. In FIG. 9, the method tries to migrate VM-2 from HOST-2 to HOST-1 and succeeds because HOST-1 having a current capacity of 100 units of resources can accommodate VM-2, which requires 100 units of resources. The current capacities of HOST-1 (destination physical host) and HOST-2 (source physical host) are updated based on the requirement of VM-2: {HOST-1: 0, HOST-2: 300, HOST-3: 100}. In FIG. 10, based on the updated current capacity, the method tries to migrate VM-1 from HOST-1 to HOST-3 but fails again because the migration would violate capacity requirements. The method backtracks and tries to migrate VM-3 to HOST-2 and succeeds because HOST-2 having current capacity of 300 units of resources can accommodate VM-3, which requires 300 units of resources. The current capacities of HOST-2 (destination physical host) and HOST-3 (source physical host) are updated based on the requirement of VM-3: {HOST-1: 0, HOST-2: 0, HOST-3: 400}. Based on the updated current capacity, the method tries to migrate VM-1 from HOST-1 to HOST-3 and succeeds (finally) because HOST-3 having a current capacity of 400 units of resources can accommodate VM-1, which requires 200 units of resources. If desired, the current capacities of HOST-2 (destination physical host) and HOST-1 (source physical host) are updated based on the requirement of VM-1: {HOST-1: 200, HOST-2: 0, HOST-3: 200}. The method ends because all of the migrations are now ordered in a migration plan, which can be represented by {<VM-2, HOST-2, HOST-1>, <VM-3, HOST-3, HOST-2>, <VM-1, HOST-1, HOST-3>}. As explained in a previous section, the namespace identifying the cloud provider can be used in the host identifier to identify the host and the cloud provider to which the host belongs.

Recursive Method for Treating a Cloud as an Aggregated Physical Host

Figure 11:
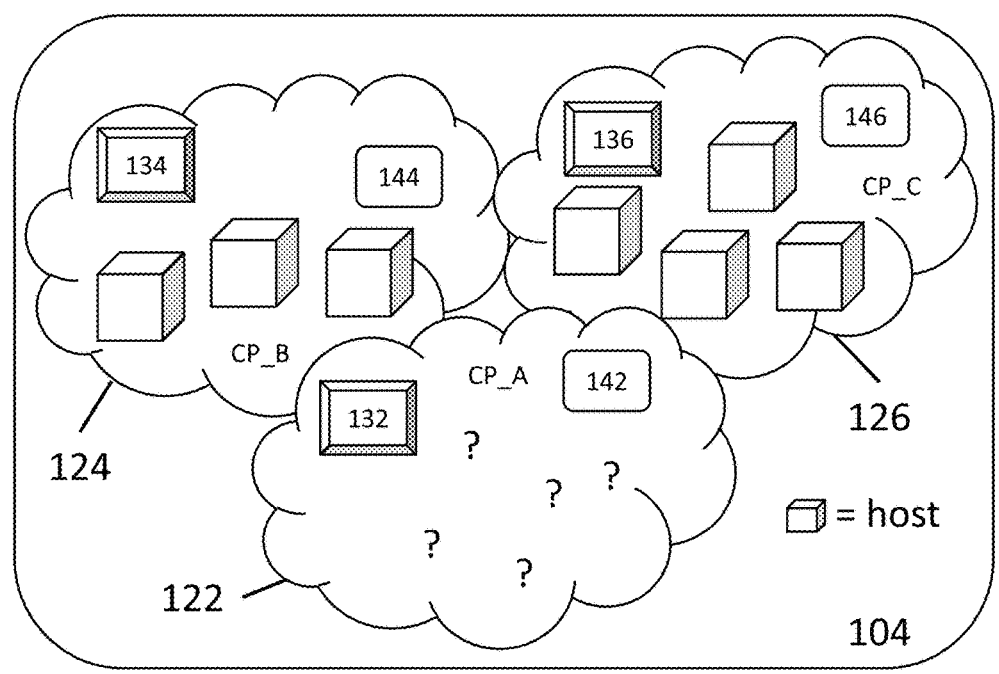
FIG. 11 shows an aggregated physical host in a federated cloud, according to some embodiments of the disclosure.

When operating in a federated cloud scenario, there are additional unique challenges to optimizing placement and rebalancing the cloud resources across the clouds. For instance, some cloud providers may not expose or provide access to execute migrations within a cloud (e.g., some cloud providers may not have an application programming interface for executing migrations within the cloud). FIG. 11 shows an aggregated physical host in a federated cloud, according to some embodiments of the disclosure. In this example, the first cloud 122 may not allow migrations to be executed by external requests. In some cases, the first cloud 122 may not provide host-by-host state information to resources monitor 112 of FIGS. 1 and 3. In another instance, there can be numerous physical hosts when many clouds are in a federated cloud. The constraints-driven optimization cloud resource placement solver increases in complexity significantly when the number of physical hosts (and the number of cloud resources even) increases.

To address these issues, the disclosed mechanisms for cloud resource placement and rebalancing can be implemented as a recursive placement decision scheme. When determining the optimized placement of cloud resources, cloud resource placement optimizer 116 and/or resources monitor 112 can aggregate physical hosts managed by a first cloud provider as an aggregated physical host. Defining assignment variables and cost variables can include defining assignment variables and cost variables based on the aggregated physical host and other physical hosts managed by cloud providers different from the first cloud provider.

In some embodiments, the decision scheme can pool capacities of physical hosts of a cloud managed by a particular cloud provider and logically present the collective capacity available as a single (aggregate) physical host. The optimization can determine that some cloud resources is to be migrated to or from this logical aggregate physical host. The particular cloud provider can then internally execute those migrations.

In some embodiments, the recursive placement decision scheme can be viewed as hierarchical scheduling, where a high level scheduling is first performed according to aggregated information from each cloud in the federated cloud. First decision involves optimizing placement of a particular cloud resource at the cloud level (e.g., deciding which cloud should the cloud resource be placed). Second decision involves optimizing placement of the particular cloud resource at the physical host level within the optimal cloud (e.g., deciding which physical host should the cloud resource be placed in the optimal cloud). Both of these decisions can be performed by cloud resource placement optimizer 116 of FIGS. 1 and 3.

In the federated cloud scenario, some cloud providers do not allow tenants to request or demand a specific order for migrating cloud resources. To address this issue, the same recursive scheme can also be applied in the migrations enforcer 118. The backtracking-based method can treat physical hosts of a particular cloud as a single physical host. In some embodiments, determining the ordered migration plan comprises determining host capacities based on the state information, wherein determining the host capacities comprises aggregating state information associated with physical hosts managed by a first cloud provider as an aggregated physical host, and determining a sequence of migrations of cloud resources from source physical hosts (including the aggregated physical host) to destination physical hosts (including the aggregated physical host) which does not violate capacity requirements of the destination physical hosts (including the aggregated physical host) during the sequence of migrations. The same backtracking-based method is applied, but the method treats physical hosts of a particular cloud as a single aggregated physical host. The migrations enforcer 118 can still transmit requests to migrate cloud resources to or from the particular cloud, but the specific ordering of migrations from one physical host to another physical host within the particular cloud is decided by the cloud provider of the particular cloud.

Advantages

The present disclosure describes systems and methods for enabling a smart and optimized monitoring data driven cloud rebalancing via cloud resource migration designed specifically for the scenario of dealing with resources from federated cloud providers. When compared to conventional solutions, the systems and methods described herein greatly improves upon the migration process. In one aspect, a resources monitor collects information across the federated cloud. In another aspect, a rebalance trigger triggers the cloud rebalancing with comprehensive support for reactive, proactive, and periodic triggering. For instance, the rebalance trigger can respond to events or alarms, or when some monitoring data crosses the thresholds to trigger a rebalance of the cloud (reactive triggering). The rebalance trigger can also study and analyze the historical data, and also monitor the user loads, to predict the rebalances (proactive trigger). The rebalance trigger can also allow for periodic scheduling rebalances (scheduled triggering). In yet another aspect, an optimizer determines optimized placement of cloud resources across the clouds. The optimization can ensure all the existing placement constraints or policies imposed by tenants and/or cloud providers are satisfied, while optimizing all the costs. The optimization advantageously enables the required cloud resource migrations to be determined, and optimizes these migrations such that the physical hosts are optimally used by the cloud resources, and also such that the cost and impact of migration is minimized (e.g., keeping the number of migrations to a minimum). In yet another aspect, a migration enforcer implements a migration ordering mechanism to calculate a feasible ordering of the migrations. Advantageously, migrations can be executed without service disruption. Smarter rebalancing can help federated clouds guarantee quality of service and other service level agreements.

Variations and Implementations

Some examples herein are related to virtual machine placement and virtual machine migrations. These examples are serve to illustrate how the constraints-driven optimization cloud resource placement solver 310 operates; these examples are not meant to be limiting. The present disclosure encompasses other types of placements involving other types of cloud resources, such as storage resources and network resources. The teachings herein easily extends to the other cloud resource migrations, in terms of the Storage (logical storage volumes placement) or the network (logical networks distribution). Storage and Network resources are other resources that can also be balanced in the cloud, based on their utilizations. For instance, the teachings extend to migrations of logical virtual storage volumes from one host disks to another host disk. This can involve detaching the storage volumes and then migrating the storage volumes. Storage cloud metrics can be monitored, and the cloud metrics can include such as Storage IOPS (IO operations per second), storage capacity, etc., and optimized migrations can be determined in a similar manner.

Within the context of the disclosure, a cloud of physical hosts generally includes physical hosts communicably connected over a network. A network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or parts shown in FIGS. 1, 3, and 11, are meant to encompass suitable elements such as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements or parts shown in FIGS. 1 and 4-9 may include any suitable hardware, software, components, modules, interfaces, or objects that facilitate the virtual machine placement operations thereof. This may be inclusive of appropriate algorithms and communication protocols (which can be carried out by one or more processors) that allow for the effective exchange of data or information.

In some implementations, elements including the cloud resource placement and rebalancing system for a federated cloud and any parts therein may include software to achieve (or to foster) the functions discussed herein where the software is executed on one or more processors to carry out the functions. This could include the implementation of instances of resources monitor, rebalance trigger, cloud resource placement optimizer, migrations enforcer, and/or any other suitable part that would foster the activities discussed herein. Additionally, each of these elements can have an internal structure (e.g., one or more suitable processors, one or more memory elements, processor 108 of FIG. 1, memory 110 of FIG. 1, etc.) to facilitate some of the operations described herein. In other embodiments, these functions for cloud resource placement and rebalancing may be executed externally to these elements, or included in some other network element to achieve the intended functionality. Alternatively, the cloud resource placement and rebalancing system for a federated cloud and any parts therein may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the cloud resource placement and rebalancing functionalities outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases/data structures related to costs, constraints, rules, host states, etc. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the cloud resource placement and rebalancing system for a federated cloud and any parts therein, etc.) can include memory elements for storing information to be used in cloud resource placement and rebalancing, as outlined herein. Additionally, each of these devices may include a processor that can execute software or an algorithm to perform the cloud resource placement and rebalancing activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements or parts shown in FIGS. 1, 3, and 11. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of cloud resource placement and rebalancing, as potentially applied to a myriad of other architectures.

It is also important to note that the steps/tasks illustrated by the FIGS. 2 and 8-10 (or any steps/tasks described herein) illustrate only some of the possible scenarios that may be executed by, or within, the cloud resource placement and rebalancing system described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by the cloud resource placement and rebalancing system (and any parts therein) in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for cloud resource placement and migration optimization for a federated cloud, the method comprising:

monitoring state information associated with cloud resources and physical hosts in the federated cloud having a plurality of clouds managed by a plurality of cloud providers;

triggering, based on one or more conditions, a rebalancing request to initiate cloud resource placement optimization;

determining, by a constraints-driven optimization cloud resource placement solver, an optimized placement of cloud resources on physical hosts across the plurality of clouds in the federated cloud based on (1) costs including migration costs, (2) the state information, and (3) constraints, wherein each physical host is identified in the constraints-driven optimization cloud resource placement solver by an identifier of a respective cloud provider and an identifier of the physical host, comprising:

defining M×N number of assignment variables indicating whether a particular cloud resource is to be placed on a particular physical host, wherein M is the number of cloud resources and N is the number of available physical hosts in the federated cloud;

defining N×M number of cost variables indicating cost of migrating a particular cloud resource from a current physical host to another physical host in the federated cloud and/or cost of placing the particular cloud resource on a particular physical host; and solving for the optimized placement of cloud resources based on the assignment variables and the cost variables;

determining an ordered migration plan for the optimized placement of cloud resources based on the optimized placement of cloud resources and the state information; and transmitting one or more requests to place or migrate cloud resources in the plurality of clouds in the federated cloud according to the ordered migration plan.

2. The method of claim 1, wherein monitoring the state information in the federated cloud comprises:
normalizing different types of state information associated with different cloud providers to a common schema.

3. The method of claim 1, wherein monitoring the state information in the federated clouds comprises:
receiving state information from respective agents deployed in respective clouds in the federated cloud.

4. The method of claim 1, wherein state information comprises one or more of the following:
current placements of cloud resources to physical hosts;
number of cloud resources;
resource requirements of cloud resources;
number of workloads;
number of physical hosts; and
capacities of physical hosts.

5. The method of claim 1, wherein state information comprises one or more of the following:
one or more events that occurred in the federated cloud;
one or more alarms in the federated cloud;
one or more metrics associated with application(s) running on the federated cloud;
one or more metrics associated with physical hosts in the federated cloud; and
one or more metrics associated with network resources in the federated cloud.

6. The method of claim 1, wherein state information associated with resources in the federated cloud comprises time-series information.

7. The method of claim 6, further comprising:
applying a predictive model on the time-series information to determine predicted state information;
wherein the one or more conditions include the predicted state information meeting a predetermined criteria.

8. The method of claim 1, wherein the one or more conditions include a scheduled time condition.

9. The method of claim 1, wherein the one or more conditions include the state information meeting a predetermined criteria.

10. The method of claim 1, wherein determining the optimized placement of cloud resources comprises:
defining constraints, in terms of the assignment variables and/or the cost variables, based on one or more of the following: the state information, one or more policies, one or more business rules, one or more affinity rules, and one or more anti-affinity rules; and
wherein the solving comprises solving for the optimized placement of cloud resources based on the constraints and an objective function in terms of the assignment variables and cost variables.

11. The method of claim 10, wherein determining the optimized placement of cloud resources comprises:
aggregating physical hosts managed by a first cloud provider as an aggregated physical host; and
wherein defining the assignment variables and the cost variables comprises defining assignment variables and cost variables based on the aggregated physical host and other physical hosts managed by cloud providers different from the first cloud provider.

12. The method of claim 1, wherein determining the ordered migration plan comprises:
determining a sequence of migrations of cloud resources from source physical hosts to destination physical hosts which does not violate capacity requirements of the destination physical hosts during the sequence of migrations.

13. The method of claim 1, wherein determining the ordered migration plan includes:
determining a series of migrations from the optimized placement of cloud resources;
determining capacities of physical hosts and requirements of cloud resources associated cloud resources and physical hosts of the series of migrations based on the state information; and
executing a backtracking-based method comprising:
(1) determining if a current capacity of a particular destination physical host for a particular migration accommodates requirement of a particular cloud resource for the particular migration;
(2) if the current capacity accommodates the requirement, adding the particular migration from the series of migrations to the ordered migration plan and updating the current capacity of the particular destination physical host and a particular source physical host for the particular migration based on the requirement; and
(3) if the current capacity does not accommodate the requirement, repeat steps (1) and (2) for other migration(s) in the series of migrations which have not been added to the ordered migration plan based on current capacities of physical hosts until all migrations in the series of migrations are added to the ordered migration plan.

14. The method of claim 1, wherein determining the ordered migration plan comprises:
determining host capacities based on the state information, wherein determining the host capacities comprises aggregating state information associated with physical hosts managed by a first cloud provider as an aggregated physical host; and determining a sequence of migrations of cloud resources from source physical hosts including the aggregated physical host to destination physical hosts including the aggregated physical host which does not violate capacity requirements of the destination physical hosts including the aggregated physical host during the sequence of migrations.

15. A cloud resource placement and rebalancing system for a federated cloud, the system comprising:

one or more memory elements;

one or more processors coupled to one or more memory elements; and a resources monitor that when executed by the at least one processor is configured to monitor state information associated with cloud resources and physical hosts in the federated cloud having a plurality of clouds managed by a plurality of cloud providers;

a rebalance trigger that when executed by the at least one processor is configured to trigger, based on one or more conditions, a rebalancing request to initiate cloud resource placement optimization;

a cloud resource placement optimizer that when executed by the at least one processor is configured to determine an optimized placement of cloud resources on physical hosts across the plurality of clouds in the federated cloud based on (1) costs including migration costs, (2) the state information, and (3) constraints, wherein each physical host is identified in the constraints-driven optimization cloud resource placement solver by an identifier of a respective cloud provider and an identifier of the physical host, comprising:

defining M×N number of assignment variables indicating whether a particular cloud resource is to be placed on a particular physical host, wherein M is the number of cloud resources and N is the number of available physical hosts in the federated cloud;

defining N×M number of cost variables indicating cost of migrating a particular cloud resource from a current physical host to another physical host in the federated cloud and/or cost of placing the particular cloud resource on a particular physical host; and solving for the optimized placement of cloud resources based on the assignment variables and the cost variables; and a migrations enforcer that when executed by the at least one processor is configured to:

determine an ordered migration plan for the optimized placement of cloud resources based on the optimized placement of cloud resources and the state information; and transmit one or more requests to place or migrate cloud resources in the plurality of clouds in the federated cloud according to the ordered migration plan.

16. The cloud resource placement and rebalancing system of claim 15, wherein monitoring the state information in the federated cloud comprises:

normalizing different types of state information associated with different cloud providers to a common schema.

17. The cloud resource placement and rebalancing system of claim 15, wherein:

state information associated with resources in the federated cloud comprises time-series information;

the rebalance trigger is further configured to apply a predictive model on the time-series information to determine predicted state information; and the one or more conditions include the predicted state information meeting a predetermined criteria.

18. A computer-readable non-transitory medium comprising one or more instructions, for cloud resource placement and migration optimization for a federated cloud, that when executed on a processor configure the processor to perform one or more operations comprising:

monitoring state information associated with cloud resources and physical hosts in the federated cloud having a plurality of clouds managed by a plurality of cloud providers;

triggering, based on one or more conditions, a rebalancing request to initiate cloud resource placement optimization;

determining, by a constraints-driven optimization cloud resource placement solver, an optimized placement of cloud resources on physical hosts across the plurality of clouds in the federated cloud based on (1) costs including migration costs, (2) the state information, and (3) constraints, wherein each physical host is identified in the constraints-driven optimization cloud resource placement solver by an identifier of a respective cloud provider and an identifier of the physical host, comprising:

defining M×N number of assignment variables indicating whether a particular cloud resource is to be placed on a particular physical host, wherein M is the number of cloud resources and N is the number of available physical hosts in the federated cloud;

defining N×M number of cost variables indicating cost of migrating a particular cloud resource from a current physical host to another physical host in the federated cloud and/or cost of placing the particular cloud resource on a particular physical host; and solving for the optimized placement of cloud resources based on the assignment variables and the cost variables;

determining an ordered migration plan for the optimized placement of cloud resources based on the optimized placement of cloud resources and the state information; and transmitting one or more requests to place or migrate cloud resources in the plurality of clouds in the federated cloud according to the ordered migration plan.

19. The computer-readable non-transitory medium of claim 18, wherein: determining the optimized placement of cloud resources comprises:

aggregating physical hosts managed by a first cloud provider as an aggregated physical host; and wherein defining assignment variables and cost variables comprises defining the assignment variables and the cost variables based on the aggregated physical host and other physical hosts managed by cloud providers different from the first cloud provider;

defining constraints, in terms of the assignment variables and/or cost variables, based on one or more of the following: the state information, one or more policies, one or more business rules, one or more affinity rules, and one or more anti-affinity rules; and wherein the solving comprises solving for the optimized placement of cloud resources based on the constraints and an objective function in terms of the assignment variables and cost variables.

20. The computer-readable non-transitory medium of claim 18, wherein determining the ordered migration plan comprises:
   determining a sequence of migrations of cloud resources from source physical hosts to destination physical hosts which does not violate capacity requirements of the destination physical hosts during the sequence of migrations.

* * * * *